UNITED STATES PATENT OFFICE.

HARRY O. CHUTE, OF CLEVELAND, OHIO.

ART OF PURIFYING RUBBER.

No. 890,217.

Specification of Letters Patent.

Patented June 9, 1908.

Application filed October 21, 1907. Serial No. 398,384.

*To all whom it may concern:*

Be it known that I, HARRY O. CHUTE, a citizen of the United States, residing at Cleveland, Cuyahoga county, State of Ohio, have invented certain new and useful Improvements in the Art of Purifying Rubber; and I do hereby declare the following to be a full, clear, and exact description of the same, such as will enable others skilled in the art to which it appertains to practice and use the same.

This invention relates to the art of purifying rubber and consists in a method of purifying crude rubber, said method comprising the treatment of crude rubber by a compound solvent consisting of an acetic ester protected from hydrolysis by an admixture of its dissociation products, or one of them; all as more fully hereinafter set forth and as claimed.

Crude rubbers, and particularly those of the poorer grades, contain relatively large amounts of impurities, this being particularly true of the rubbers from the newer sources, such as pontianak, or "dead borneo," guayule, Africans and a number of the "extracted rubbers." Better grade rubbers however also contain more or less impurity which may be removed. The impurities ordinarily found comprise in addition to moisture, which frequently exists in rather large quantity and is difficult and expensive to remove by drying methods, considerable quantities of resins, some fat and extractive matters. In the extracted rubbers derived from vegetable materials by the use of hydrocarbon solvent, there is also usually some residual hydrocarbon. The amount of water is occasionally quite large, as for instance in crude pontianak, some samples of which contain as high as 60 per cent. of water to only about 10 per cent. of real rubber, the residue being mainly resin. Guayules often contain a third of their weight as resin, water and other impurities. In the purification of these wet, resinous rubbers by extraction with solvents it is of course necessary in practice to choose a solvent in which rubber itself is substantially insoluble while water, resin, fat and hydrocarbon oils will dissolve. This combination of properties it is difficult to find in any single solvent. The acetic esters, or the compounds of acetic acid with the lower alcohols, come nearest the ideal, ethyl acetate, for instance, being at once a solvent for resins, hydrocarbons, and, to some extent, for water, while rubber is very little soluble therein. Unfortunately, however, these esters being derived from an alcohol and an acid with elimination of water are prone to undergo the reverse transformation and take up water to re-form acid and alcohol, this being particularly the case when such esters are heated in a moist condition, as in distilling after use in treating moist rubbers. This liability to decomposition makes the acetic esters *per se* rather less advantageous for use in treating wet rubbers. In recovering the esters after use they are apt to hydrolyze more or less in the still, causing a loss of solvent and rendering it necessary to use stills of acid-resisting material.

It is the object of the present invention to use these esters in a protected form, that is, in admixture with another solvent which will exercise a protective action against hydrolysis of such esters, simultaneously converting them into compound solvents better adapted in point of solvent power for the present purposes. It has been found that these esters do not hydrolyze with water to an unlimited extent but that the decomposition goes forward to a certain limiting amount; to a point where a certain balance exists between the amounts of undecomposed esters, acid, alcohol and water; and that upon reaching this point the hydrolysis ceases. Ethyl acetate can therefore be protected against such decomposition by the addition of acetic acid and ethyl alcohol, its hydrolytic products, in sufficient amount to obtain this balance. But as a matter of practice, it is found that it is not necessary to add both hydrolytic products; that the presence of either one of them in the theoretical amount is sufficient to produce the desired result. Ethyl acetate can therefore be protected against hydrolysis by the presence of either acetic acid or ethyl alcohol. A mixture of ethyl acetate and glacial acetic acid has many advantages for the present purposes, but in the embodiment of this invention at present preferred, the protective substance is ethyl alcohol.

Methyl acetate may be protected by either acetic acid or methyl alcohol, methyl alcohol being at present preferred.

Aside from the protection to the ester afforded by the presence of the alcohol, the mixture of alcohol and ester has certain advantages in treating rubber. The presence of the alcohol gives the ester better solvent properties for water while not materially diminishing its solvent properties for resin. At the same time, in the presence of the alcohol, the solvent powers of the ester for rubber itself are diminished to a negligible amount. The compound solvent is well adapted to remove the residual hydrocarbons in "extracted rubber." The compound solvent used in the present invention may be either ethyl acetate protected by ethyl alcohol or methyl acetate protected by methyl alcohol. All four bodies may be used together if desired.

Ethyl alcohol and ethyl acetate having nearly the same boiling point, a mixture may be fractionated and otherwise treated in column stills as if it were a single body, while the protective action of the alcohol allows the mixture to be fractionated out of water without hydrolysis of the ester, and with as much ease and certainty as alcohol alone. This is of course a vital point in the treatment of crude, undried rubber in which operation the first portions of solvent used on a sample of rubber always become charged with water.

The amount of ethyl alcohol required to protect ethyl acetate from hydrolysis, or of methyl alcohol required to protect methyl acetate, is not great, though of course this amount depends somewhat on the proportion of water with which the compound solvent may be mixed. The more of either alcohol is mixed with either acetate, the greater the miscibility of the compound solvent with water and consequently the greater is the amount of water which will be taken up by a given amount of such compound solvent; e. g., the more alcohol is required for protection. Ordinarily however 10 per cent. of alcohol will serve as a sufficient protection and give a compound solvent of the desirable qualities stated. In use, the resin extracted from the rubber appears to reinforce the protective action of the alcohol to some extent. Greater quantities of alcohol, up to 50 per cent. or more, may however be used in making the compound solvent for some purposes. Ethyl acetate and ethyl acetate mixed with but a small proportion of ethyl alcohol are not as good for operating upon very moist rubbers as ethyl acetate mixed with greater proportions of ethyl alcohol. The ethyl acetate is however desirable in greater proportion when the deresinifying action is primarily desired since ethyl acetate is one of the best solvents for rubber resin and while its admixtures with ethyl alcohol have a greater solvent power apparently than the average solvent power of the two bodies, yet the solvent power of the ester is so much greater that for deresinifying it is desirable usually to have not much more alcohol than is necessary for protection of the acetate against hydrolysis. Boiling ethyl acetate will dissolve upwards of 50 per cent. of some rubber resins while ethyl alcohol will dissolve but about 8 per cent. of the same resins. Methyl acetate has but about half the resin dissolving power of the ethyl acetate and methyl alcohol will dissolve but a per cent. or so of such resins.

The presence of water in the compound solvent cuts down its solvent power for resin materially, and in use of the present process it is usually desirable that the rubber be first dried in any of the ordinary rubber driers by any of the ordinary methods to remove the bulk of the moisture, thereby economizing in the amount of the compound solvent to be used. The moisture may however be removed by the solvent directly if so desired, the alcohol acting to protect the ester. In drying the rubber by the ordinary methods, such as sheeting and drying *in vacuo* or by long continued exposure to dry air, more or less moisture will usually remain unless extraordinary precautions be taken, particles of moisture being inclosed by the rubber substance.

In either compound solvent the alcohol employed may be that arising from the hydrolysis of the particular ester used, or it may be reinforced by another alcohol.

In the present preferred embodiment of my process, I add alcohol to an acetic ester to produce the compound solvent and then wash the rubber, dried or undried, with such compound solvent, finally removing the solution of resin and other impurities to regain the solvent. The regained solvent may be again employed in lieu of a fresh mixture of its components. The rubber may be torn or disintegrated by any suitable mechanism in the presence of the compound solvent. The used solvent may be regained by simple distillation or by fractional distillation as the character of the liquid extract of the rubber impurities may indicate. If this extract contains much water, it is best fractionated.

After treatment of the rubber, the adhering solvent may be removed by washing with a little water forming an aqueous solution of the compound solvent from which such compound solvent may be readily regained by distillation. In this distillation the alcohol protects the ester. On further washing the rubber with more water, using any of the ordinary mills or rolls for this purpose, removal of sticks, leaves, sand and other mechanical impurities can be accomplished with extraordinary ease, the removal of the sticky resins leaving the rubber proper with but little tendency to cling to foreign bodies. The completeness with which this subsequent mechanical purification can be accomplished is one of the great advantages in the use of my process. Apparently the employment of my compound solvent leaves the rubber in better shape than does the use of the ester alone.

I prefer the compound solvent arising from the admixture of ethyl alcohol with ethyl acetate, but for some rubbers the solvent formed by mixing methyl alcohol with methyl acetate is rather more advantageous. The ethyl alcohol used may be ordinary denatured spirit, the denaturing bodies ordinarily used, such as gasoline, benzine, wood spirit, acetone, etc., also having a protective action upon ethyl acetate. The ethyl acetate may be made from such denatured spirit, the gasolene and other bodies mixing harmlessly and advantageously with the ester. The methyl alcohol used for making methyl acetate and for mixing with it may be the ordinary wood spirit, the presence of the methyl acetone, acetone, and other ketonoid bodies being advantageous rather than harmful.

Extraction of the rubber with the compound solvent is preferably facilitated by the action of heat, the hot compound solvent of course dissolving more resin than the cold. Cold extraction may however be performed, but it will involve the use of more solvent and more time. In the hot extraction of moist rubber, the presence of the protective alcohol prevents the liberation of acetic acid from the ester by hydrolysis and consequently corrosion of metallic containers.

What I claim is:—

1. In the purification of rubber, the process which comprises producing a compound solvent containing an acetic ester and an alcohol and extracting rubber with the same.

2. In the purification of rubber, the process which comprises producing a compound solvent containing ethyl acetate and ethyl alcohol and extracting rubber with the same.

3. In the purification of rubber, the process which comprises mixing an alcohol with an acetic ester derived from such alcohol and extracting rubber with the compound solvent so formed.

4. In the purification of rubber, the process which comprises mixing ethyl alcohol with ethyl acetate and extracting rubber with the compound solvent so formed.

5. In the purification of rubber, the process which comprises extracting rubber with a compound solvent containing an alcohol and an acetic ester.

6. In the purification of rubber, the process which comprises extracting rubber with a compound solvent containing ethyl alcohol and ethyl acetate.

7. In the purification of rubber, the process which comprises extracting rubber with an acetic ester protected against hydrolysis by an admixture of one of its hydrolytic products.

8. In the purification of rubber, the process which comprises extracting rubber with a compound solvent comprising an acetic ester and a protecting substance.

In testimony whereof I affix my signature, in the presence of two witnesses.

HARRY O. CHUTE.

Witnesses:
ALFRED M. HOUGHTON,
RICHARD A. CURTIN.